United States Patent [19]

Sato et al.

[11] Patent Number: 5,479,632
[45] Date of Patent: Dec. 26, 1995

[54] MICROCOMPUTER HAVING TWO-LEVEL MEMORY TO FACILITATE CALCULATION OF EFFECTIVE ADDRESSES

[75] Inventors: Fumiki Sato; Kouichi Fujita, both of Hyogo, Japan

[73] Assignee: Mitsubishi Denki Kabushiki Kaisha, Tokyo, Japan

[21] Appl. No.: 248,833

[22] Filed: May 25, 1994

Related U.S. Application Data

[63] Continuation of Ser. No. 695,045, May 2, 1991, abandoned.

[30] Foreign Application Priority Data

Oct. 15, 1990 [JP] Japan ................................. 2-275757

[51] Int. Cl.[6] .................................................. G06F 12/08
[52] U.S. Cl. ..................... 395/421.04; 395/375; 395/416; 395/421.1
[58] Field of Search ...................................... 395/375, 400, 395/425, 421.04

[56] References Cited

U.S. PATENT DOCUMENTS 4,975,837  12/1990  Woodward et al. ..................... 395/375

*Primary Examiner*—Tod R. Swann
*Assistant Examiner*—J. Peikari
*Attorney, Agent, or Firm*—Townsend and Townsend and Crew

[57] ABSTRACT

A microcomputer includes a layered memory having a higher layer for storing a series of instructions forming a program to be executed by the microcomputer and a lower layer, having an upside layer accessed by ID information in the instructions stored in the higher layer memory, and a downside layer, accessed by the upside layer, having a sequence of storage locations storing code data for controlling the execution unit to calculate effective addresses.

8 Claims, 3 Drawing Sheets

MICROCOMPUTER HAVING TWO-LEVEL MEMORY TO FACILITATE CALCULATION OF EFFECTIVE ADDRESSES

This is a continuation of Ser. No. 07/695,045, filed May 2, 1991, now abandoned.

BACKGROUND OF THE INVENTION

1. Field of the Invention

The present invention relates to a microcomputer, and more particularly to a microcomputer in which memory efficiency for storing a program is improved and a high addressing flexibility can be provided.

2. Description of Prior Art

FIG. 3 is a diagram showing the contents of a program memory in a conventional microcomputer.

Referring to FIG. 3, a program memory 1 and includes sections 2, 3, and 4 storing codes or data written in the program memory 1. The program memory 1 includes function designating sections 2 holding codes for designating the type of function performed by an instruction, address mode designating sections 3 holding information for calculating an effective address, and parameter holding sections 4 holding parameters being data for calculating the effective address or data for functions. Referring to FIG. 3, first function designating section, address designating section, and parameter designating sections 2a, 3a, 4a, and 4b form one instruction and second function designating section, address designating section, and parameter designating sections 2b, 3b, 4c, and 4d form another instruction.

The microcomputer reads the function code parts of those instruction functions so as to decide a processing to be performed. Then, the microcomputer reads information relating to the effective address so as to decide an addressing mode and reads a parameter sequential to the information of the effective address, so that the effective address is generated. Data designated by the generated effective address is processed as decided previously. Those serial processes are performed for each instruction, so that the microcomputer performs a program which is a congregation of considerable number of instructions.

FIG. 4 shows main parts of the conventional microcomputer having the above mentioned memory structure. Referring to the FIGURE, the microcomputer comprises an exclusive read only memory ROM 11, a random access memory RAM 12, peripherals 13 including input/output unit, and a CPU 14, and those members are connected to each other through an address bus 15a, a data bus 15b, and a control bus 15c. On the other hand, the CPU 14 comprises a bus interface 14a, a prefetch buffer 14b which temporarily stores a read-in program, a data buffer 14c which temporarily stores data at memory access, a pattern ROM 14d, a pattern ROM address decoder 14e, and an execution unit 14f.

The bus interface 14a reads in a program from the ROM/RAM if there is a space in the prefetch buffer 14b, and sends an operation code to the pattern ROM address decoder 14e if the execution unit 14f requests an operation code. And, if the execution unit 14f requests an immediate data, an immediate data is sent to the execution unit 14f, and if the execution unit 14f requests a memory access, a memory is accessed. The pattern ROM address decoder 14e generates an address of the pattern ROM 14d to be accessed next in accordance with an operation code from the prefetch buffer 14b or the address from the pattern ROM 14d. The execution unit 14f operates in accordance with a pattern which is read out from the pattern ROM 14d.

The conventional microcomputer is constructed as described above. In such a microcomputer, however, the demand for improved functionality and high performance has caused the number of functions types and addressing mode included in the instruction set to increase. However, the instructions including the various function types and addressing modes cannot be stored in one byte, i.e., 8 bits, which is the minimum unit of memory management. At least 2-bytes of 3-bytes of memory is necessary to store such high performance instructions. Further, additional bytes of parameters data for calculating effective addresses are generally required thus further increasing the number of bytes necessary to store the instructions.

In addition, since only a limited number of types of addressing modes have been previously programmed and are available in the microcomputer, when a user of the microcomputer uses an addressing form which had not been prepared previously an is not available in the microcomputer for a specific function, it will be necessary that a routine made by a combination of instructions be placed before an instruction that requires the specific function to generate its effective address, or the routine can be in the form of a sub-routine with an instruction for calling the sub-routine placed before it. Thus, software will be necessary to perform the specific function.

SUMMARY OF THE INVENTION

An object of the present invention is to provide a microcomputer in which the memory efficiency is improved by decreasing the number of bytes per instruction and the flexibility of addressing is also improved. To this end, the microcomputer relating to the present invention has a program memory constructed of layers.

According to one aspect of the invention, a program memory includes an upper layer and a lower layer. The upper layer stores a program consisting of a group of instructions, with each instruction comprising codes specifying conventional functions, addressing modes, and parameters for generating effective addresses or encoding immediate data, and address information for accessing a lower layer. The lower layer stores codes specifying functions to be performed and addressing modes.

According to a further aspect of the invention, the lower layer may be formed of 2 layers or of 1 layer.

A lower layer formed of 2 layers includes an upside layer and a downside layer. The upside layer stores codes specifying functions to be performed and fields specifying the number of bytes described required to store an instruction in the upper layer and address information for accessing the downside layer in the lower layer. In the downside layer, operation codes for generating the effective address and operation code for executing the functions are described.

A lower layer formed of only one layer stores codes specifying functions to be performed in the lower layer is designated and the operation code for generating the effective address.

According to a further aspect of the invention, the lower layer can be implemented using a RAM.

Thus, according to the present invention a microcomputer program memory stores only the address information for accessing the lower layer memory and parameter for generating the effective address or the immediate data an upper memory, so that the memory efficiency of the program memory will be improved. The functions and addressing modes stored in the lower layer memory are used in common, so that only the number of different types of functions and addressing modes need be prepared and stored. Thus, the lower layer memory can be constructed with a limited capacity in the form of table. Further, according to one aspect of the invention, a micro code which had been fixed in the conventional microcomputer is made variable, i.e., is made programmable, so that the flexibilities of the addressing modes and functions will be improved.

Although the efficiency and flexibility of the memory can be improved considerably with a simple structure even when the lower layer is constructed with a single layer, the efficiency can also be obtained even in a case where the address mode is the same and only the function is different if the lower layer is formed of 2 layers.

And also, if a part or whole of the lower layer memory for the program memory is made of RAM, the generating procedure of the effective address can be programmed more freely, so that the flexibility of the addressing mode will be remarkably improved.

The above and other objects, features, and advantages of the invention will become more apparent from the following description when taken in conjunction with the accompanying drawings.

DESCRIPTION OF THE PREFERRED EMBODIMENT

The embodiment of the present invention will be explained hereinafter with reference to the drawings.

Figure 1:
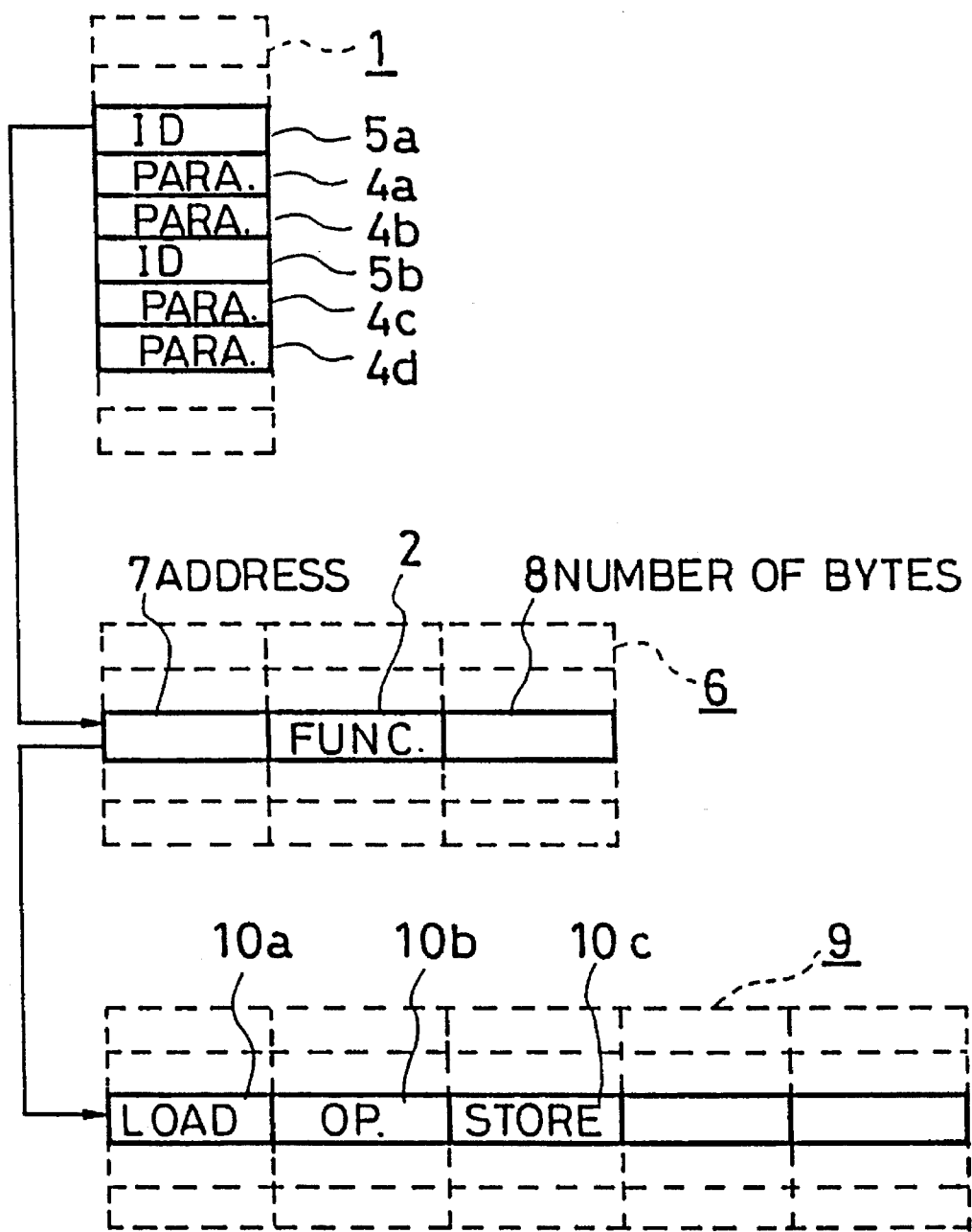
FIG. 1 is a diagram showing a memory layer structure of an embodiment of microcomputer constructed according to the present invention.

FIG. 1 is a diagram showing the memory layer structure of the microcomputer of an embodiment according to the present invention. Referring to FIG. 1, a program memory 1 of an upper layer includes sections 4 and 5 having codes or data written therein. Included are sections for storing address information 5a and 5b, i.e. ID codes, for accessing a lower layer memory, and sections for storing parameters for generating effective addresses 4a, 4b, 4c, and 4d. An upside layer memory 6 is included in a lower layer memory having 2-layer structure, and sections 2, 7, and 8 store data written in this memory. An address storing section 7 stores an address for accessing a downside layer in the lower layer memory, a function section 2 stores a code for designating a function to be performed, a number of bytes storing section 8 stores in information on the number of bytes of parameters written in the upper layer. A downside layer memory 9 is also included in the lower layer of the memory having the 2-layer structure. Sections 10a, 10b and 10c in the downside layer memory store various operation codes for calculating effective addresses, performing functions, and storing results in accordance with the parameters written in the upper layer and the function designation codes written in the upside layer of the lower layer. The upside layer memory 6 and the downside layer memory 9 are constructed in the form of tables as shown in FIG. 1.

Next, the operation of the microcomputer relating to the present invention will be explained.

As an example, a case of executing the instruction Add A,ADRS, where a sum of the contents of an accumulator and a memory is to be stored in the accumulator, will be explained hereinafter.

The ID code which is address information for accessing the upside layer memory 6 in the lower layer memory and memory address to be added to the accumulator as a parameter are written in sections of the upper layer of the program memory 1. The microcomputer accesses the upside layer memory 6 in the lower layer by utilizing the ID code. The address for accessing the downside layer memory 9, information that the function of the instruction is Add, and number of bytes of the memory address to be added to the accumulator are written in the upside layer memory 6. The microcomputer accesses the downside layer memory 9 by the address written in the upside layer memory 6.

The operation code for entering the contents of the accumulator into a first temporary register, the operation code for entering data to be added to the accumulator, fetched from memory according to the memory address given by the program memory 1, into a second temporary register, the operation code for executing functions written in the upside layer memory 6 for the contents of the 2 temporary registers, and the operation code for storing the results in the accumulator are written in the downside layer 9. By executing those operation codes, the microcomputer executes Add A,ADRS.

An important point here is that the ID code to be written in the program memory 1 can be of 1 byte, and the memory efficiency has been ameliorated compared to the 2 to 3 bytes required for designating the functions and addressing modes in the conventional microcomputer.

Further, if the lower layer memory is made of RAM, a necessary addressing mode can be easily programmed, so that the flexibility of addressing will be remarkably improved.

Figure 2:
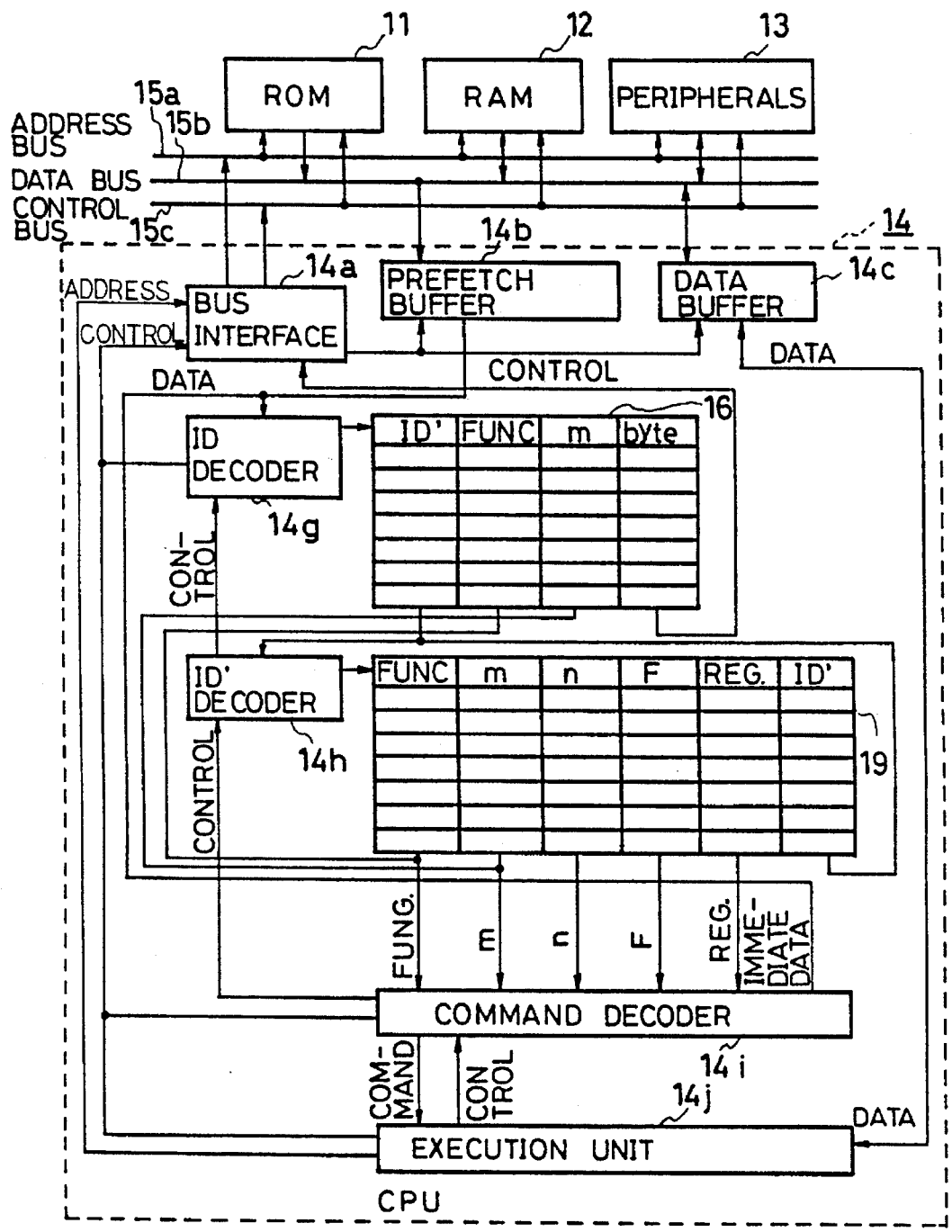
FIG. 2 is a block diagram showing the main part of the structure of an embodiment of the microcomputer constructed according to the present invention.
Figure 3:
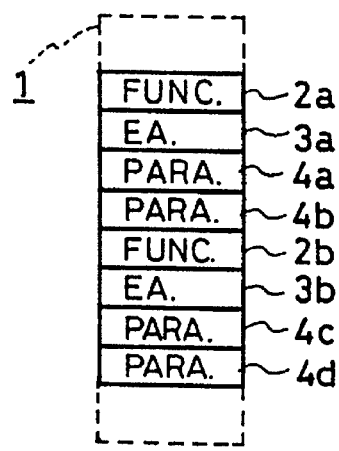
FIG. 3 is a diagram showing a program memory of a conventional microcomputer.
Figure 4:
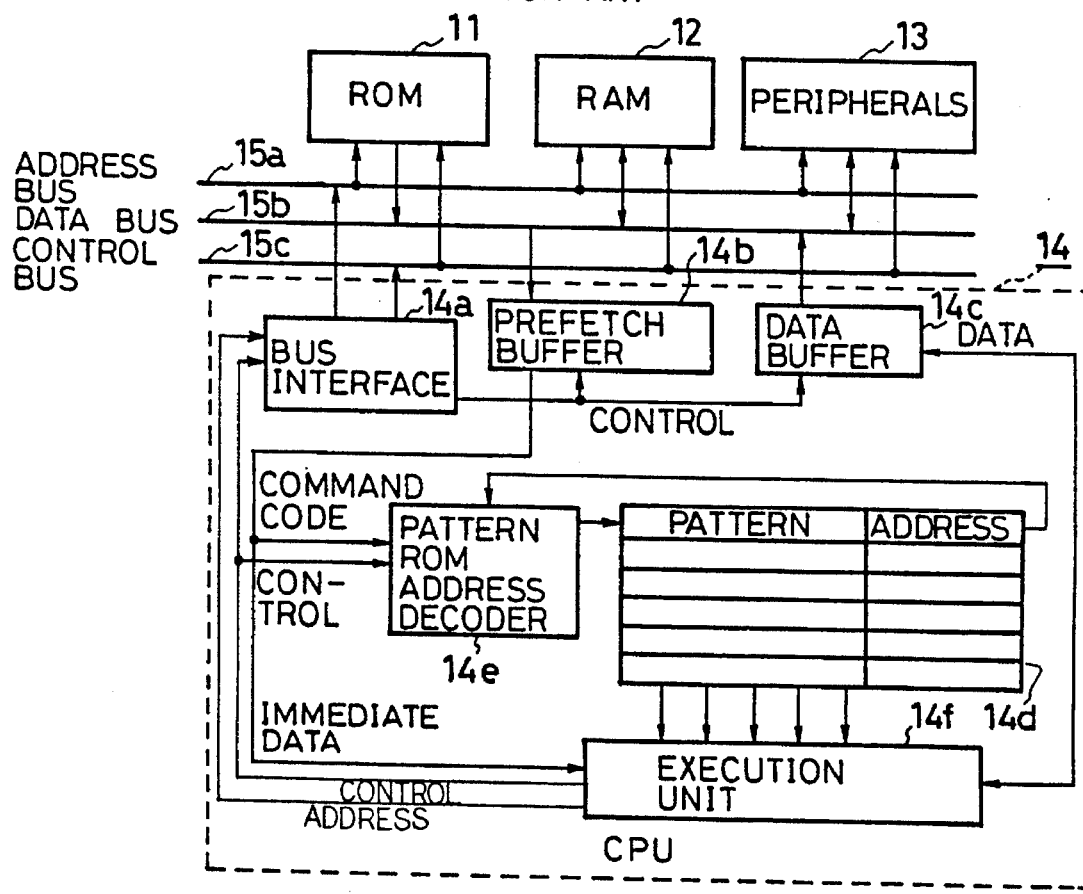
FIG. 4 is a block diagram showing the main part of the structure of the conventional microcomputer.

FIG. 2 shows the main part structure of the microcomputer to which the above mentioned construction of the memory layer is applied. A CPU 14, includes a bus interface 14a, a prefetch buffer 14b for storing temporarily a read-in program, a data buffer 14c for storing data temporarily at memory access, an intermediate table 16 and a lower memory 19 corresponding to the upside layer memory 6 and the downside layer memory 9 shown in FIG. 1. The intermediate table 16 and lower memory 19 are constructed in the form of a table in RAM, thereby being programmable. Also included are an ID decoder 14g and an ID' decoder 14h, for accessing the intermediate table 16 and lower memory 19, an instruction decoder 14i, and an execution unit 14j.

The bus interface 14a reads in the program from the ROM/RAM if a space exists in the prefetch buffer 14b. When the ID decoder 14g requests an ID, the ID is sent to the ID decoder 14g if the ID is stored in the prefetch buffer 14b. When the instruction decoder 14i requests immediate data (numeric value/register designation), the immediate data is sent to the instruction decoder 14i if the immediate data is stored in the prefetch buffer 14b, and a memory is accessed if the execution unit 14j requests the memory access.

A row of the intermediate table 16 is accessed by each different ID and stores ID', FUNC., m, and byte data corresponding to each ID. The ID decoder 14g decodes the ID sent from the prefetch buffer 14b through the bus interface 14a and reads out ID', FUNC code, m field, and byte field data from a row in the intermediate table 16.

The ID' indicates address information for designating one of the rows in the lower memory 19. The FUNC. code indicates a function designation (ADD, SUB etc.), the m field indicates a width of calculation data (1 byte, 2 bytes, 4 bytes), and the byte field indicates a length of an instruction. The lower memory 19 stores FUNC. code and, m, n, F, REG. fields, corresponding to each ID', and an ID' of a row to be accessed next. The ID' decoder 14h decodes the ID' and reads out the FUNC. code and, m, n, F, REG. fields, and ID' from the lower memory 19.

When the ID' read out from the lower memory 19 is a termination code, an ensuing ID' is required of the ID decoder 14g. In other cases, the ID' of the lower memory 19 is used as an ensuing ID'. The FUNC. code designates a function (LOAD, STORE, ADD, SUB. etc.), the m field represents a width of calculation data, the n field represents a width of immediate data, the F field represents whether a calculated result is to affect a flag or not, and the REG. field represents a register being used.

On the other hand, the command decoder 14i decodes the FUNC. code and, m, n, F, and REG. fields and sends a command to the execution unit 14j. If the FUNC. code and m field which are read out from the lower memory 19 have a specific, predetermined value, then the FUNC. code and m field read out from the intermediate table 16 are to be decoded by the command decoder 14i. If the REG. field has a specific predetermined value, then the register designation is regarded as immediate data, and a request for register designation immediate data is sent to the bus interface 14a. Also, a request for numeric data is sent to the bus interface 14a in response to the n field. The execution unit 14j comprises therein a register file, ALU, MUL/DIV unit and other elements, and executes a command given by the command decoder 14i. If a memory access is necessary, a request for memory access is sent to the bus interface 14a.

In the above mentioned embodiment, the lower layer is formed of 2 layers so as to be effective even in the case where the same address mode is used and only the function to be performed is different. However, even if the lower layer is formed of 1 layer, the memory efficiency and flexibility can be improved considerably by such a simple structure.

Although the whole lower layer memory is formed of RAM in the above mentioned embodiment, the object of the present invention can be attained even if a part or whole of the lower layer memory is formed of ROM.

According to the present invention, as described above, then program memory is formed of layers and only the ID code and the parameter are written in the upper layer of the program memory, so that the memory efficiency will be improved. Also, if the lower layer is made of RAM, the addressing mode becomes programmable, thereby improving the flexibility of the addressing remarkably.

What is claimed is:

1. A microcomputer system including an improved program execution system comprising:

a higher layer program memory having a plurality of addressable storage locations for storing a plurality of instructions for specifying the functions of a program to be executed by the microcomputer and said higher layer program memory having an output for providing data stored in an accessed storage location, with each instruction including only an ID word stored in a single storage location and optionally one or more parameters, stored in storage locations immediately following said single storage location, for use in address or numerical calculations;

an upside layer program memory, having a plurality of storage locations, each accessed by one of said ID words stored in said higher layer program memory, and said upside layer program memory having an output for providing data stored in an accessed storage location, each storage location for storing upside layer data, including a function specifying portion, and an ID' word, and with a first ID' word stored at a first storage location accessed by the ID word included in the corresponding instruction;

a downside layer program memory, having a plurality of addressable storage locations, each accessed by an ID' word, and said downside layer program memory having an output for providing data stored at an accessed storage location, with each storage location for storing downside layer data, including a function code portion, and an ID' word, with a first storage location accessed by the first ID' word;

ID decoding means, coupled to said upside layer program memory and to the output of said higher layer program memory to receive an ID word accessed from said higher layer memory, for accessing an addressable storage location in said upside layer program memory specified by said accessed ID word;

ID' decoding means, coupled to said downside layer program memory and to the output of said upside and downside layer program memories to receive an ID' word accessed from said upside or downside layer program memories, for accessing said first addressable storage location is said downside layer program memory when said first ID' word is received and for accessing a second addressable storage location in said downside layer program memory when an ID' word stored in said first addressable storage location in said downside program memory is received;

an execution unit for performing a function specified by said instruction and for calculating effective addresses of data to be processed in performing said function in response to received control signals; and command decoding means, coupled to the output of said higher layer and upside and downside layer program memories to receive said parameters, and said upside and downside layer data, for generating control signals to control said execution unit to calculate effective addresses in response to downside layer function code portions accessed from said downside layer program memory, and, responsive to a received function code portion of downside layer data, using said upside layer function code portion to form a command to control said execution unit to perform a function specified in said program if said received downside function code portion is a specific code and using said downside layer function specifying portion to form a command if said received function code portion is not the specific code so that the same storage locations in the downside layer can be utilized for a particular addressing mode if the function to be performed by the instruction in the program is different.

2. The system of claim 1 wherein: part of said downside layer program memory is a ROM.

3. The system of claim 1 wherein: said downside layer program memory is a rewritable RAM.

4. The system of claim 1 wherein one of said ID' words is a termination code and said ID' decoder requests a new ID' word from said upside layer program memory when an said termination code is output from said downside layer program memory.

5. A microcomputer system including an improved program execution system, coupled to a higher layer program memory, and comprising an upside layer program memory, a downside layer program memory, ID decoding means, ID' decoding means, command decoding means and an execution unit;

said higher layer program memory having a plurality of storage locations to be specified by a plurality of addresses for storing a plurality of instructions forming a program to be executed by the microcomputer, each instruction including a single ID code and optionally one or more parameters for use in address or numerical calculations;

said upside layer program memory having a plurality of storage locations, each accessed by one of the ID codes, for outputting upside layer function code data and an ID' word from a storage location accessed by said ID code;

said downside layer program memory having a plurality of storage locations for storing downside layer function code data and ID' words, each accessed by one of said ID' words stored in said upside layer program memory or said downside layer program memory, and outputting downside layer function code data and an ID' word;

said ID decoding means, coupled to said higher layer program memory to receive an ID code from said higher layer memory, for accessing an addressable storage location in said upside layer program memory specified by the received ID code;

said ID' decoding means, coupled to said upside layer program memory and said downside layer program memory to receive an ID' word from said upside or downside layer program memory, for accessing an addressable storage location in said downside layer program memory specified by the received ID' word;

said command decoding means, coupled to said higher layer and upside and downside layer program memories to receive the parameters, the upside layer function code data and the downside layer function code data, for generating control signals from the downside layer function code data optionally one or more parameters or from the downside layer function code data and the upside layer function code data and optionally one or more parameters in accordance with a value of a specified portion of the downside layer function code data; and said execution unit coupled to said command decoding means to receive the control signals, for performing effective address calculations or arithmetic and logic operations in response to the received control signals.

6. A microcomputer according to claim 5, wherein the upside layer function code data includes a portion for specifying one of a plurality of arithmetic and logic operations, the downside layer function code data also includes a portion for specifying one of a plurality of arithmetic and logic operations, and said command decoding means replaces the portion of said downside layer function code data generated from said downside layer program memory with the portion of the upside layer function code data for specifying one of arithmetic and logic operations generated from said upside layer program memory 7. A microcomputer according to claim 5 or 6, wherein one of the ID' words is a termination code, and said ID' decoding means requests a new ID' word from said upside layer program memory when said termination code is output from said downside layer program memory.

8. A microcomputer according to claim 5 or 6, wherein said upside layer program memory is responsive to ID codes for different instructions which are the same in address mode and different in type of operation to output the ID' codes and different upside layer function code data.

* * * * *